(12) United States Patent
Hirano et al.

(10) Patent No.: US 9,475,376 B2
(45) Date of Patent: Oct. 25, 2016

(54) INVERTED TYPE LIQUID SEALED MOUNT

(71) Applicant: YAMASHITA RUBBER KABUSHIKI KAISHA, Fujimino-shi, Saitama (JP)

(72) Inventors: Yukinobu Hirano, Fujimino (JP); Hiroshi Murao, Fujimino (JP)

(73) Assignee: YAMASHITA RUBBER KABUSHIKI KAISHA, Fujimino-Shi (JP)

( * ) Notice: Subject to any disclaimer, the term of this patent is extended or adjusted under 35 U.S.C. 154(b) by 0 days.

(21) Appl. No.: 14/651,473

(22) PCT Filed: Dec. 18, 2013

(86) PCT No.: PCT/JP2013/083944
§ 371 (c)(1),
(2) Date: Jun. 11, 2015

(87) PCT Pub. No.: WO2014/098149
PCT Pub. Date: Jun. 26, 2014

(65) Prior Publication Data
US 2015/0328969 A1 Nov. 19, 2015

(30) Foreign Application Priority Data

Dec. 21, 2012 (JP) ................................. 2012-280162

(51) Int. Cl.
*F16F 9/54* (2006.01)
*B60K 5/12* (2006.01)
(Continued)

(52) U.S. Cl.
CPC ............... *B60K 5/1233* (2013.01); *F16F 9/10* (2013.01); *F16F 9/3207* (2013.01); *F16F 9/54* (2013.01); *F16F 13/18* (2013.01)

(58) Field of Classification Search
CPC ...... B60K 5/1233; F16F 9/10; F16F 9/3207; F16F 9/54; F16F 13/18
See application file for complete search history.

(56) References Cited

U.S. PATENT DOCUMENTS 5,269,498 A * 12/1993 Bretaudeau ............. F16F 13/10
267/140.13

(Continued)

FOREIGN PATENT DOCUMENTS

| JP | 2003-214482 | 7/2003 |
| JP | 2004-100734 | 4/2004 |

OTHER PUBLICATIONS

International Search Report, Date of mailing: Apr. 1, 2014.

*Primary Examiner* — Vishal Sahni
(74) *Attorney, Agent, or Firm* — Rankin, Hill & Clark LLP

(57) ABSTRACT

Annular liquid chamber resonance in an inverted type liquid sealed mount is controlled without using flow resistance. In an engine mount including a secondary liquid chamber located in an upper position, a primary liquid chamber located in a lower position, a main body section of an insulator projecting upwardly in substantially a chevron shape, and an annular liquid chamber formed around the main body section, a control projection is provided on an outside wall of the main body section to project upwardly and configured to produce elastic body resonance in the vicinity of a resonance frequency of annular liquid chamber resonance. With this construction, the annular liquid chamber resonance is controllable by the elastic body resonance of the control projection, and the control projection is increased in size so as to endure flow resistance whereby to improve durability.

4 Claims, 9 Drawing Sheets

(51) Int. Cl.
*F16F 9/10* (2006.01)
*F16F 9/32* (2006.01)
*F16F 13/18* (2006.01)

(56) References Cited

U.S. PATENT DOCUMENTS

| | | | | |
|---|---|---|---|---|
| 6,390,458 B2* | 5/2002 | Okanaka | ............... | F16F 13/105 267/140.11 |
| 6,523,814 B2* | 2/2003 | Kodama | ................ | F16F 13/105 267/140.13 |
| 6,799,753 B2* | 10/2004 | Okanaka | .................. | F16F 13/10 267/140.11 |
| 7,063,191 B2* | 6/2006 | Hopkins | ................ | F16F 13/305 188/267.2 |
| 7,216,858 B2* | 5/2007 | Andou | ................... | F16F 13/105 267/140.13 |
| 2004/0188902 A1* | 9/2004 | Okanaka | ............... | F16F 13/108 267/140.13 |

\* cited by examiner (A)

(B)

INVERTED TYPE LIQUID SEALED MOUNT

TECHNICAL FIELD

The present invention relates to a liquid sealed vibration isolating device for use in an engine mount or the like, and more particularly, to an inverted type liquid sealed mount in which a primary liquid chamber is arranged on the lower side and a secondary liquid chamber is arranged on the upper side.

Herein, an orientation of an upper and lower direction shall be determined based on a state to be used.

BACKGROUND ART

The inverted type liquid sealed mount like above is publicly known and comprises an insulator which forms a vibration isolating main body made of an elastic body such as rubber or the like and surrounds a part of a liquid chamber, the liquid chamber being partitioned upward and downward into a secondary liquid chamber on the upper side and a primary liquid chamber on the lower side, and a damping orifice connecting the secondary liquid chamber and the primary liquid chamber, wherein the insulator projects in the upward direction in substantially a chevron shape into the primary liquid chamber.

In the case of using it as an engine mount, an engine is mounted on an inner metal fitting which is integrally formed with the insulator, and an outer metal fitting surrounding the liquid chamber is mounted on a vehicle body. The engine is supported in a suspended condition, whereby the inverted type liquid sealed mount is also referred to as a suspended type mount.

An example of the inverted type liquid sealed mount as above is shown in FIG. 9 which is a cross sectional view corresponding to FIG. 3 of the present invention. FIG. 9(A) is a cross sectional view taken along a mount axis L of the inverted type liquid sealed mount (a cross section taken along line A-A of FIG. 9(B)), and FIG. 9(B) is a transverse cross sectional view (a cross section taken along line B-B of FIG. 9(A)). With respect to this inverted type liquid sealed mount, an inner metal fitting 102 to be mounted on the engine and an outer metal fitting 103 of cylindrical shape to be mounted on the vehicle body are connected by an insulator 108. An opening section of the outer metal fitting 103 is covered with a diaphragm 104. An inside of the liquid sealed amount is partitioned by a partition member 105 into a primary liquid chamber 106 and a secondary liquid chamber 107. A damping orifice 109 provides a connection between the primary liquid chamber 106 and the secondary liquid chamber 107.

The insulator 108 forms a main body section 110 a center portion of which projects upwardly in substantially a chevron shape. A circumference of the insulator 108 forms a foot section 112 which extends outwardly in the radial direction to reach and be united with the outer metal fitting 103. In a circumference of the main body section 110 there is formed an annular liquid chamber 106a of substantially a V-shaped cross section. This annular liquid chamber 106a is a part of the primary liquid chamber 106 and is configured to produce liquid resonance in a high frequency range above a resonance frequency of the damping orifice 109 when the liquid flows annularly within the annular liquid chamber 106a by a vibration in the direction orthogonal to the mount axis L (hereinafter, referred to as "horizontal vibration"). This liquid resonance shall be referred to as "annular liquid chamber resonance".

Further, in the main body section 110 there are continuously and integrally formed flow resistance projections 120 and 130 which project upwardly and integrally from an outer lateral surface of the foot section 112 and which are of a cylindrical shape being open upwardly. As shown in FIG. 9(B), the flow resistance projections 120 and 130 are formed concentrically in a ring shape in a circumference of the main body section in such a way as to cause the flow resistance to the annular flow.

PRIOR ART REFERENCE

Patent reference 1: Japanese patent application laid open publication JP 2003-214482 A.

DISCLOSURE OF THE INVENTION

Problem to be Solved by the Invention

By the way, since, in the inverted type liquid sealed mount, there may be cases where the vibration of the vehicle body grows worse due to the annular liquid chamber resonance, it is required to suppress this annular liquid chamber resonance and to change the resonance frequency. As a method for this reason, in the above prior art example, the flow resistance projections 120 and 130 which project into the primary liquid chamber are provided in order for ruffling the liquid flow by the flow resistance thereof whereby to suppress the increase in a dynamic spring constant.

In this prior art example, since the resonance power is reduced by the flow resistance, the direct effect that a dynamic characteristic by the resonance is improved is lessened, and the antiresonance is decreased in accordance with the reduction in the resonance power, with the result that the rise in the dynamic spring constant of the antiresonance is suppressed.

However, since the flow resistance projections 120 and 130 need to ruffle the liquid flow, they are subjected to great flow resistance to thereby cause a stress concentration around base portions thereof whereby a crack or the like is caused, and so the durability is decreased.

Particularly, the flow resistance projection 120 on the outer side provided in the vicinity of the deepest portion of the annular liquid chamber having a large amount of the liquid is essential. However, since the flow resistance projection 120 on the outer side is located in the vicinity of the outer metal fitting 103, the durability of the foot section 112 is decreased.

Namely, a part of the foot section 112 which is located in the vicinity of the outer metal fitting 103 and on which the flow resistance projection 120 is provided, is subjected to the greatest stress concentration due to the vibration in the transverse direction. Therefore, a root portion of the flow resistance projection 120 is also subjected to the stress concentration, so that the crack or the like is caused in the root portion of the flow resistance projection 120.

Accordingly, it is required that the increase in the dynamic spring constant based on the annular liquid chamber resonance is suppressed by other method than the suppression of the increase in the dynamic spring constant by the flow resistance of the flow resistance projection 120 or the like whereby to improve the durability of the foot section 112.

The present invention has an objective of realizing the requirements as above.

By the way, in the present invention, the resonance control of the annular liquid chamber resonance means the control of the resonance frequency in an extent including not only the resonance frequency when the annular liquid chamber resonance is greatest but also the frequency range of the antiresonance.

Means for Solving the Problem

In order to solve the above subject, an inverted type liquid sealed mount according to a first feature of the present invention comprises an inner metal fitting (2) being mounted on one of a vibration source side and a vibration receiving side, an outer metal fitting (3) being mounted on the other thereof, an insulator (8) elastically connecting the inner metal fitting (2) and the outer metal fitting (3), a liquid chamber being formed among the outer metal fitting (3), the insulator (8) and a diaphragm (4) covering an opening part of the insulator (8), a partition member (5) for partitioning the liquid chamber into a lower primary liquid chamber (6) and an upper secondary liquid chamber (7), a damping orifice (9) being provided in the partition member (5) to provide communication between the primary liquid chamber (6) and the secondary liquid chamber (7) and configured to produce liquid resonance at a predetermined low frequency and large amplitude vibration, a main body section (10) being formed by a part of the insulator (8) and projecting upwardly in substantially a chevron shape in the direction of a mount axis (L), an annular liquid chamber (6a) being provided around the main body section (10) and forming a part of the primary liquid chamber (6), and a control projection (20) being integrally provided in an outside part of the main body section (10) in such a manner as to project in the direction of the mount axis (L), wherein the control projection (20) is allowed to produce elastic body resonance at a frequency range of antiresonance due to annular liquid chamber resonance of the annular liquid chamber (6a).

According to a second feature of the present invention, in addition to the first feature, when a distance between a smallest diameter portion (10a) of the main body section (10) and a liner layer (8a) provided on an inner surface of the outer metal fitting (3) is W, the control projection (20) is provided in a region of 3W/5 or less from the smallest diameter portion (10a).

According to a third feature of the present invention, in addition to any one of the first and second features, the control projection (20) is formed in a corrugated shape in a side view.

According to a fourth feature of the present invention, in addition to any one of the first and second features, the control projection (20) is formed in a corrugated shape in a plan view.

According to a fifth feature of the present invention, in addition to any one of the first to fourth features, the control projection (20) is provided in a ring shape in a plan view on an inclined surface portion of the main body section (10) of substantially the chevron shape and formed in a region overlapping, in a side view, with a cup portion (2a) which is inserted in the main body section (10) for reinforcement.

Effects of the Invention

According to the first feature of the present invention, since the elastic body resonance occurs in the frequency range of the antiresonance due to the annular liquid chamber resonance, the peak of the antiresonance based on the annular liquid chamber resonance is lowered by making use of the elastic body resonance of the control projection (20) whereby an increase in dynamic spring constant is suppressed. Therefore, different from the prior art in which the resonance control is carried out by making use of the flow resistance, the control projection (20) is hard to be subjected to the stress concentration due to the flow resistance. As a result, the increase in the dynamic spring constant based on the annular liquid chamber resonance is suppressed, and at the same time, the durability of the main body section (10) can be improved.

According to the second feature of the present invention, since the position of the location of the control projection (20) is provided in the region of 3W/5 or less from the smallest diameter portion (10a), the control projection (20) can be provided in a position of few stress concentration within the annular liquid chamber (6a). Therefore, even if the insulator (8) is repeatedly elastically deformed by the vibration in the direction orthogonal to the mount axis (L), the control projection (20) is not easily damaged whereby the durability can be more improved.

According to the third feature of the present invention, since the control projection (20) is formed in a corrugated shape in a side view, the resonance frequency of the elastic body resonance can be controlled by changing the rigidity partially in the circumferential direction.

According to the fourth feature of the present invention, since the control projection (20) is formed in a corrugated shape in a plan view, the resonance frequency of the elastic body resonance can be controlled.

According to the fifth feature of the present invention, since the control projection (20) is formed in the region overlapping, in a side view, with the cup portion (2a) which is inserted in the main body section (10), it can be provided in a location of few elastic deformation and few stress concentration.

BEST MODE FOR CARRYING OUT THE INVENTION

Figure 1:
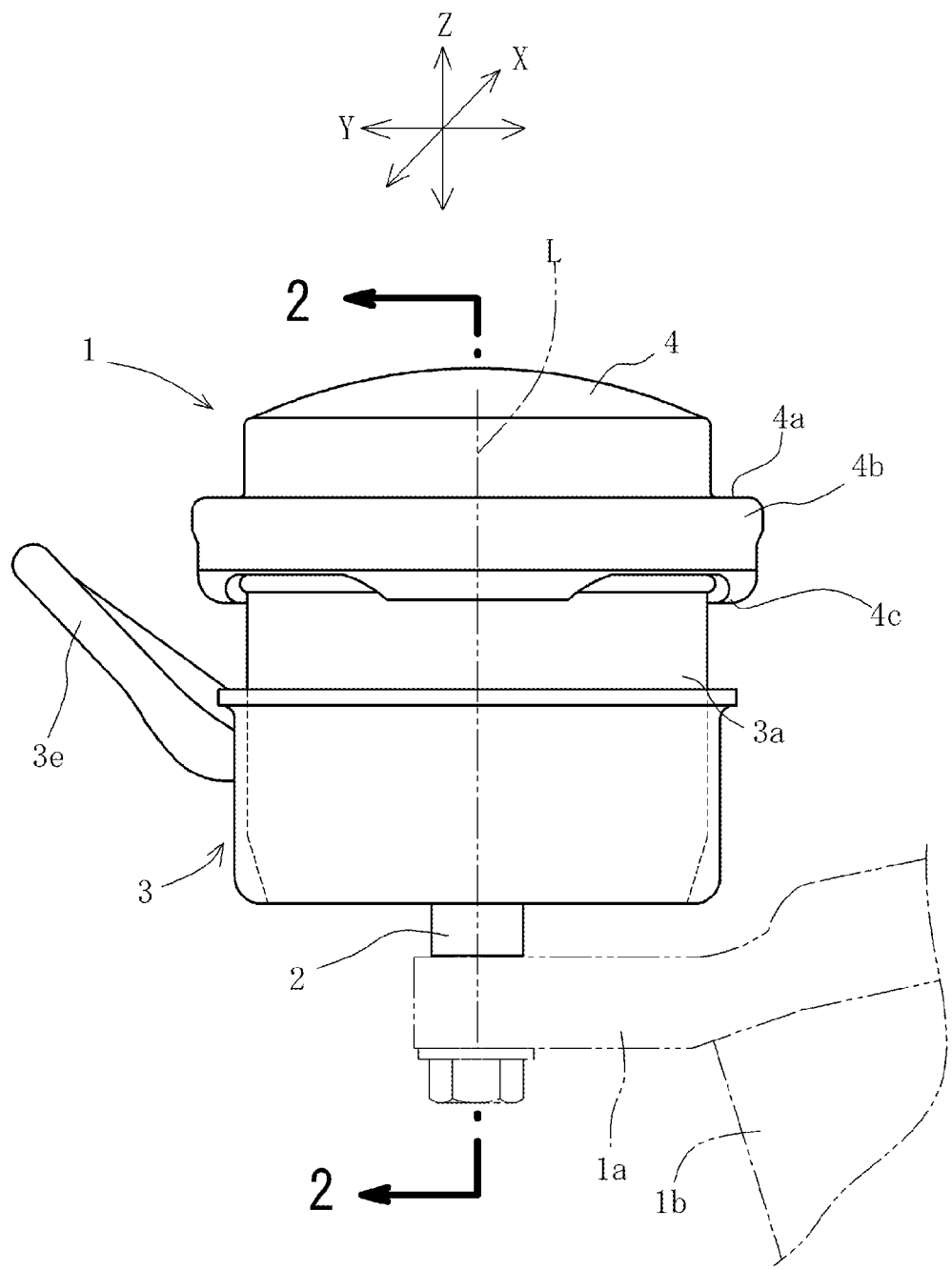
FIG. 1 is a front view showing an external appearance of an engine mount in accordance with an embodiment of the present invention.
Figure 2:
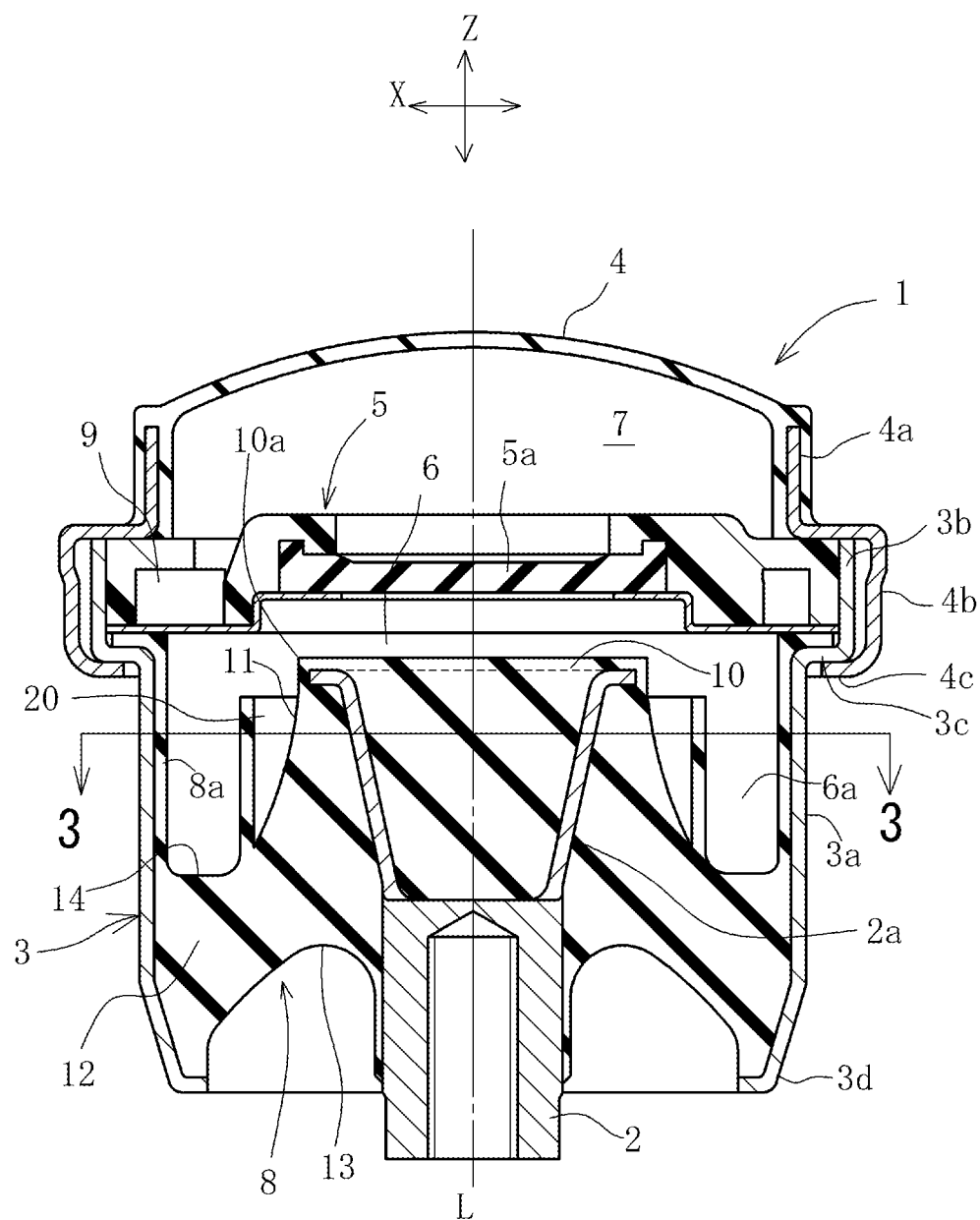
FIG. 2 is a cross sectional view taken on line 2-2 of FIG. 1.
Figure 3:
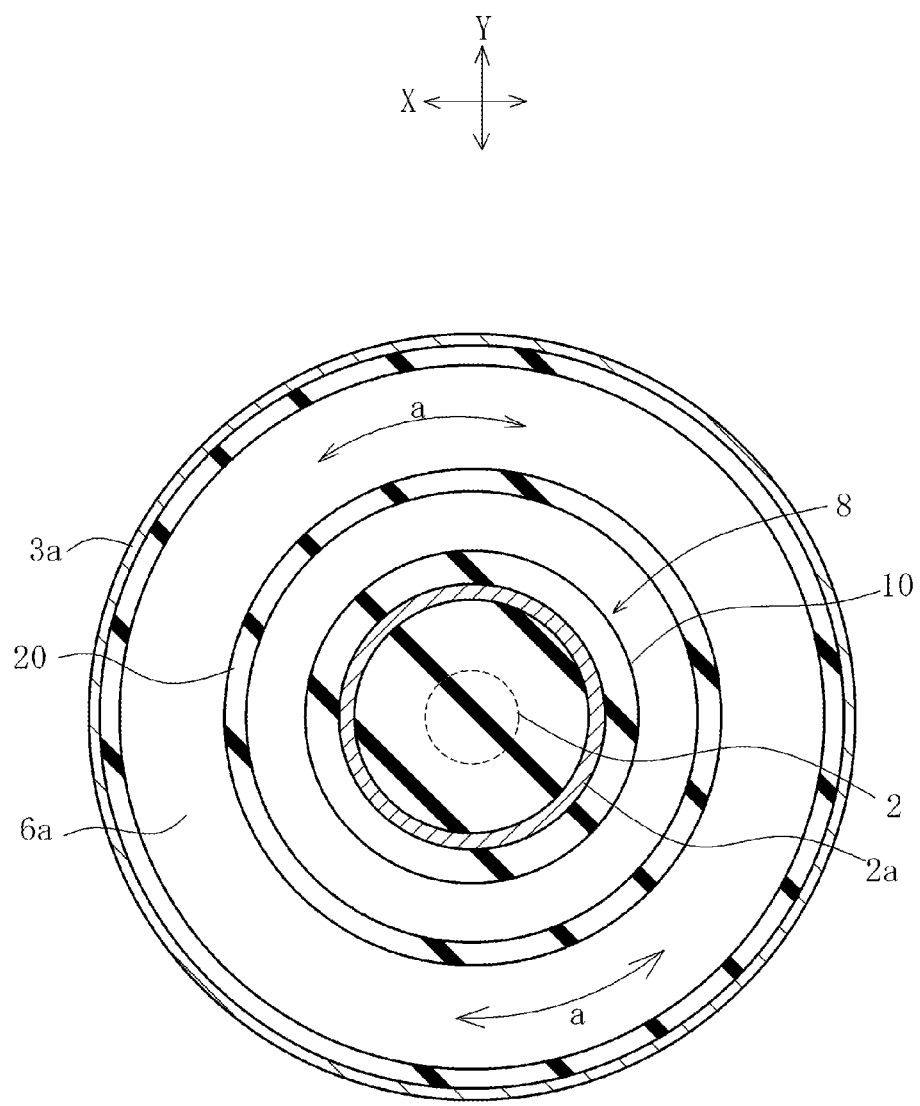
FIG. 3 is a cross sectional view taken on line 3-3 of FIG. 2.
Figure 4:
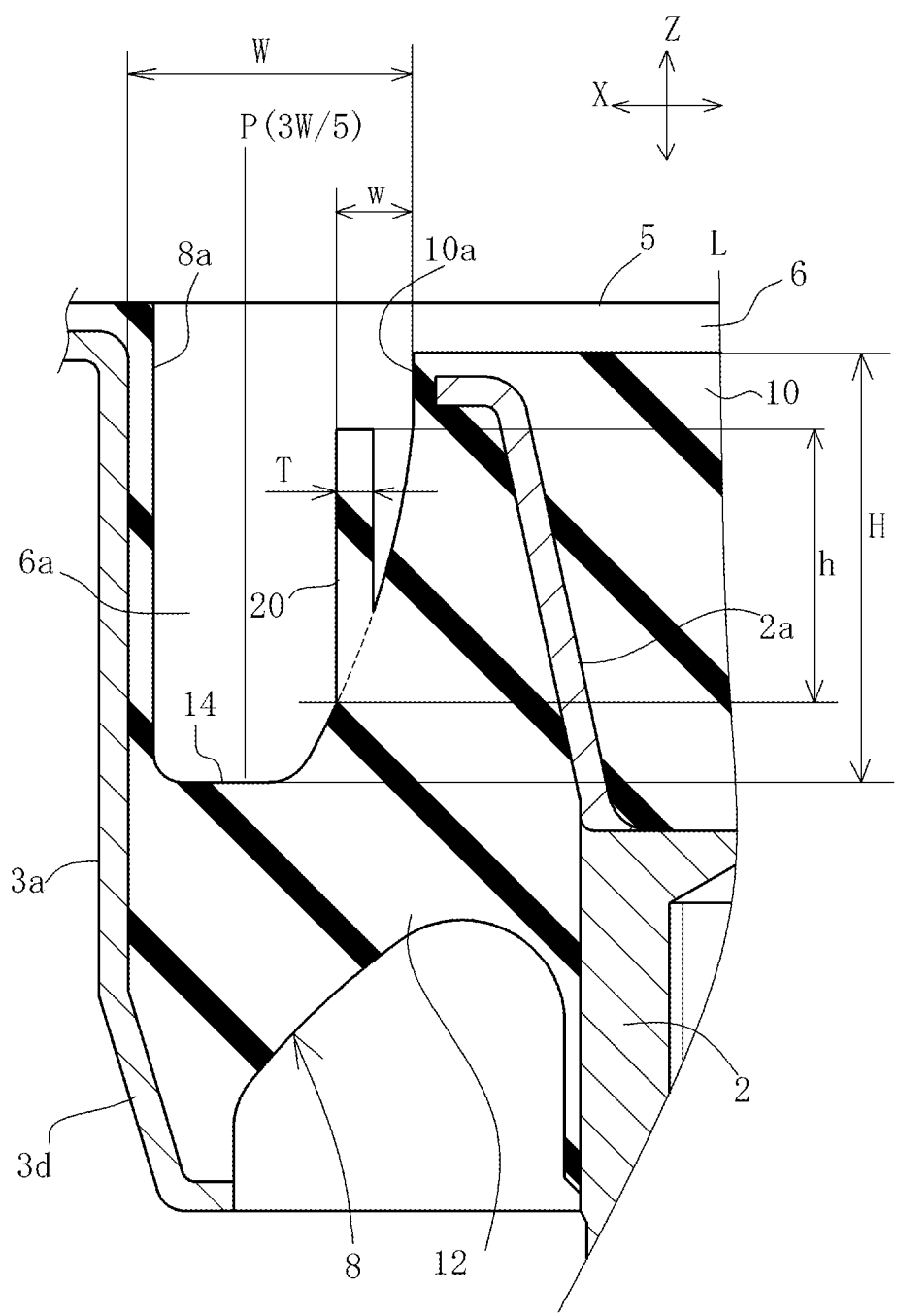
FIG. 4 is an enlarged partial cross sectional view of FIG. 2.

FIG. 1 is a front view showing an external appearance of an engine mount in accordance with an embodiment of the present invention. FIG. 2 is a cross sectional view taken on line 2-2 of FIG. 1. FIG. 3 is a cross sectional view taken on line 3-3 of FIG. 2. FIG. 4 is a view showing a part of FIG. 2 in an enlarged scale.

By the way, FIG. 1 shows a condition of use in which an engine mount 1 is mounted on a vehicle body. An upper side of the drawing is an upper side of the engine mount 1.

Further, a main vibration inputting direction of the engine mount 1 shall be designated Z, and a center line of the engine mount 1 in this direction shall be a mount axis L. Moreover, orthogonal biaxial directions on a plane orthogonal to the mount axis L shall be X and Y.

In the following description, an X axis extends in a forward and backward direction of a vehicle body, a Y axis extends in a left and right direction thereof, and a Z axis extends in the upward and downward direction thereof.

As shown in FIG. 1, this engine mount 1 is an inverted type, and an inner metal fitting 2 provided in a lower part of the engine mount 1 is connected through an engine hanger 1a to an engine 1b.

On the other hand, an outer metal fitting 3 of cylindrical shape is mounted on the vehicle body (not shown) by a bracket 3e provided in an outer circumferential part.

As a result, the engine 1b is supported in a suspended fashion on the vehicle body through the engine mount 1. A reference character 4 designates a diaphragm made of an elastic body such as rubber or the like which covers an upper opening of the outer metal fitting 3.

As shown in FIG. 2, an inner area defined by the outer metal fitting 3 and the diaphragm 4 is partitioned into a primary liquid chamber 6 and a secondary liquid chamber 7 in the upward and downward direction by a partition member 5.

A lower part of the primary liquid chamber 6 is covered with an insulator 8. The insulator 8 is a vibration isolating main body made of proper elastic material such as rubber or the like, and the vibration inputted from the engine 1b is absorbed in a responsible way by elastic deformation of the insulator 8.

The circumference of the primary liquid chamber 6 is covered with the outer metal fitting 3. By the way, on an inner surface of a cylindrical main body barrel section 3a surrounding the primary liquid chamber 6 there is integrally laminated a thin liner layer 8a which extends continuously and integrally from the insulator 8.

The primary liquid chamber 6, the secondary liquid chamber 7 and a damping orifice 9 to be referred to later are filled with an incompressible fluid such as water or the like.

The secondary liquid chamber 7 is surrounded by the diaphragm 4. An outer circumferential part of the diaphragm 4 is integrated with a supporting metal fitting 4a and supported by the supporting metal fitting 4a.

The supporting metal fitting 4a is a metal fitting of a ring shape and is formed with an enlarged diameter section 4b at an outer circumference of the partition member 5. The supporting metal fitting 4a overlaps from the outside with an enlarged diameter section 3b of the outer metal fitting 3 which also overlaps with the outer circumference of the partition member 5, and has a caulking section 4c placed on a step section 3c which is formed between the main body barrel section 3a and the enlarged diameter section 3b of the outer metal fitting 3, so that the diaphragm 4 and the outer metal fitting 3 are integrally combined with each other.

In the partition member 5 there is provided a damping orifice 9 which provides a communication and connection between the primary liquid chamber 6 and the secondary liquid chamber 7. The damping orifice 9 produces liquid resonance at a large amplitude vibration in the low frequency range so as to achieve high damping.

In addition, an elastic diaphragm 5a is provided in the partition member 5. The elastic diaphragm 5a is elastically deformed relative to a small amplitude vibration in the high frequency range in a state of the damping orifice 9 being clogged, whereby to absorb the internal pressure fluctuation.

The insulator 8 has a main body section 10 which projects upwardly in substantially a chevron shape at the center part thereof and a foot section 12 which extends radially outwardly to the main body barrel section 3a at the circumferential part of the main body section 10.

Into the inner part of the main body section 10 there is inserted a rigid cup section 2a attached to an upper end portion of the inner metal fitting 2. The cup section 2a is formed in the shape of a cup which is open upwardly, and an inner side of the cup section 2a is filled with an elastic body of the main body section 10. An outer lateral wall 11 of the main body section 10 is formed with a curved surface which is tapered in the upward direction.

The main body section 10 is continuously united with the radially outwardly extending foot section 12. The foot section 12 is elastically connected to a lower part of the main body barrel section 3a and an inverted taper section 3d. The Inverted taper section 3d is a part formed in such a manner that the lower part of the main body barrel section 3a is inclined so as to be tapered in the downward direction. When the inner metal fitting 2 is moved downwardly, the inverted taper section 3d supports an outer circumferential part of the foot section 12 and allows the foot section 12 to cause the elastic deformation including compression.

A lower surface 13 of the foot section 12 is formed with a curved surface which is recessed upwardly, and provides a connection between a lower end of the inverted taper section 3d and an upper lateral surface of the inner metal fitting 2. In addition, an upper surface of the foot section 12 is formed with a curved surface which is recessed downwardly, and provides a connection between the main body barrel section 3a and a lower part of the outer lateral wall 11 so as to form a bottom 14 of the primary liquid chamber 6.

Around the circumference of the main body section 10, there is formed an annular liquid chamber 6a of substantially a V-shaped cross section which is surrounded by the outer lateral wall 11, the foot section 12 and the main body barrel section 3a. This annular liquid chamber 6a is a part of the primary liquid chamber 6 and is configured to cause the annular flow in such a manner that the previously contained liquid in the annular liquid chamber 6a flows around the mount axis L as shown by an arrow a of FIG. 3 when the main body section 10 is moved relative to the main body barrel section 3a of the outer metal fitting 3 by the vibration (hereinafter, referred to as "horizontal vibration") in the direction orthogonal to the mount axis L.

Due to this annular flow of the liquid, the liquid resonance is configured to be produced in a high frequency range above a resonance frequency of the damping orifice 9. This liquid resonance shall be referred to as "annular liquid chamber resonance".

Next, there will be explained the construction of a part involved in resonance control in the annular liquid chamber resonance.

In the main body section 10, a cylindrical control projection 20 which projects upwardly from the outer lateral wall 11 and which is open upwardly is integrally formed continuous with the main body section 10. As shown in FIG. 3 (the cross sectional view taken on line 3-3 of FIG. 1), the control projection 20 is formed in the shape of a ring such as to be concentric with the mount axis L and the main body section 10 in a plan view. This control projection 20 is configured to produce elastic body resonance at a specifically fixed frequency which is higher than the resonance frequency of the annular liquid chamber resonance.

As also clearly shown in FIG. 4, when a distance between a smallest diameter portion 10a (a top portion) of the main body section 10 and a liner layer 8a formed on an inner surface of the outer metal fitting 3 is W, and a distance from the smallest diameter portion 10a to a position on an outer circumferential side of the control projection 20 is a distance w of location, the location of the control projection 20 is determined in such a manner that the distance w of location is 3W/5 or less.

The control projection 20 has a predetermined length h of projection and projects upwardly in parallel with the mount axis L. The reference character h is a distance from a root portion of the control projection 20 to the upper end of the control projection 20.

Moreover, when the projecting height of the main body section 10 projecting from a bottom portion 14 is H, the projecting length h of the control projection 20 is determined so as to be not more than H. The projecting height H is a distance from the bottom portion 14 to the upper end of the main body section 10.

The control projection 20 is provided on the outer lateral wall 11 of an inclined surface shape of the main body section 10 and configured to be located in a range in which it overlaps, in a side view, with the cup section 2a previously inserted into the main body section 10 for reinforcement. Accordingly, when the upper end position of the control projection is fixed, the projecting length h becomes greater as the distance w of location increases (namely, as the location of the control projection 20 goes radially outward), and inversely, the projecting length h becomes lesser with decrease in the distance w of location. In addition, within the range in which the control projection 20 overlaps with the cup section 2a in a side view, there are little elastic deformation and little stress concentration.

The control projection 20 has a predetermined wall thickness T (a minimum thickness when the thickness varies). Setting factors for setting the resonance frequency of the elastic body resonance are the distance w of location from the smallest diameter portion 10a of the main body section 10 to a reference position P, the projecting length h and the thickness T.

Among these factors, since the thickness T is not required to be as much as the flow resistance projection of the prior art example for producing the flow resistance, the control projection 20 is able to be formed thinner to the extent that membrane resonance is produced at the predetermined frequency. Therefore, the control projection 20 can be easily provided in a limited space, whereby the degree of freedom in formation of the control projection 20 is increased.

Figure 5:
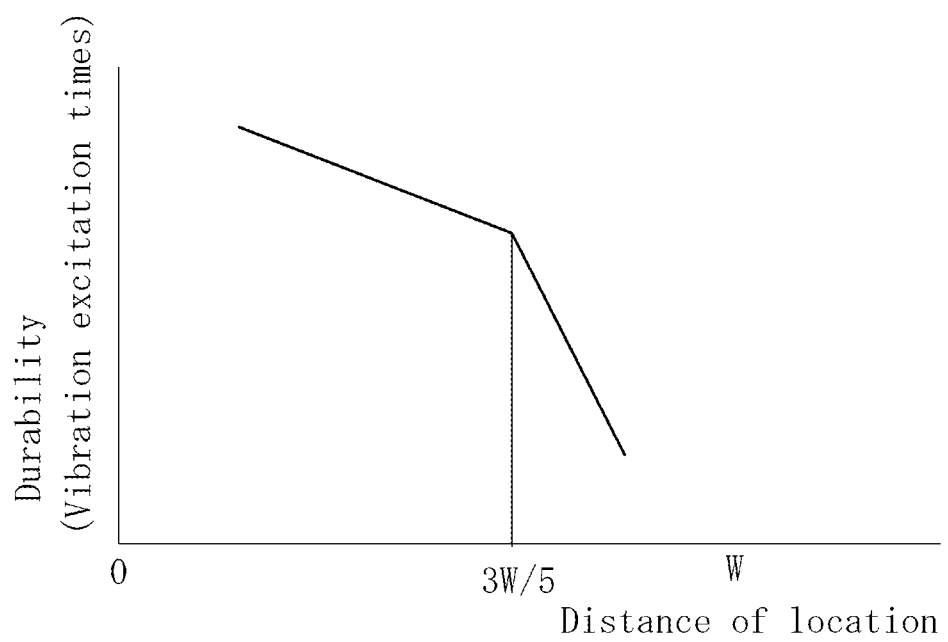
FIG. 5 is a graph indicating the relationship between a location of a control projection and a resonance frequency.

FIG. 5 is a graph indicating the relationship between the location in the radial direction of the control projection 20 and the durability, in which a vertical axis is the durability (vibration excitation times) and a horizontal axis is the distance w of the location from the smallest diameter portion 10a of the control projection 20. The durability test is carried out in such a way as to excite the engine mount 1 by the vibrations of fixed amplitude and to measure the vibration excitation times until such time that the control projection 20 is damaged.

As clearly shown in this drawing, when the distance w of the location exceeds 3W/5, the durability is decreased remarkably. The decrease in durability is due to occurrence of a crack or the like at a base portion (a root portion) of the control projection 20.

Namely, it means that, when the distance w of the location exceeds 3W/5, the stress concentration exerted on the base portion of the control projection 20 is increased whereby the durability is decreased. When the distance w of the location exceeds 3W/5, the stress concentration accompanying the elastic deformation of the foot section 12 is increased. Accordingly, the location where the distance w of the location is not more than 3W/5, is the location where the stress concentration exerted on the base portion of the control projection 20 is small. Therefore, the location in the radial direction of the control projection 20 is to be determined such that the distance w of the location is 3W/5 or less. Preferably, the location is configured to come closer to the main body section 10 in such a manner that the distance w is W/2 or less.

Figure 6:
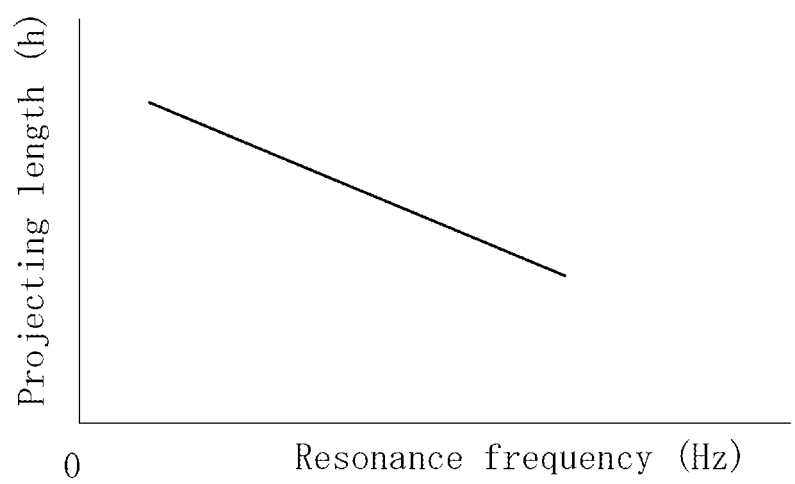
FIG. 6 is a graph indicating the relationship between a projecting height of the control projection and the resonance frequency.

FIG. 6 is a graph indicating the relationship between the projecting length h of the control projection 20 and the resonance frequency, in which the horizontal axis is the resonance frequency and the vertical axis is the projecting length h. The relationship between the projecting length h and the resonance frequency changes linearly. The resonance frequency is gradually lowered as the projecting length h becomes longer.

Therefore, the resonance frequency is able to be adjusted by the degree of the projecting length h, and the projecting length h is set according to the desired resonance frequency.

By the way, as described above, when the upper end position of the control projection 20 is fixed, the projecting length h becomes longer as the distance w of the location is increased. Accordingly, the resonance frequency is lowered as the distance w of the location is increased, and, inversely, the resonance frequency is heightened as the distance w of the location is decreased.

Next, the operation will be explained.

First, when the horizontal vibration of the high frequency is inputted, the annular flow is created within the annular liquid chamber 6a. At that time, since the control projection 20 does not act too much as the flow resistance, the resonance power is not decreased.

Further, since the control projection 20 is configured to produce the elastic body resonance in the vicinity of a peak frequency of the antiresonance by the input vibration at the higher frequency side than the resonance frequency of the annular liquid chamber 6a, the peak of the antiresonance is lowered by the elastic body resonance. This is indicated in a graph of FIG. 7.

Figure 7:
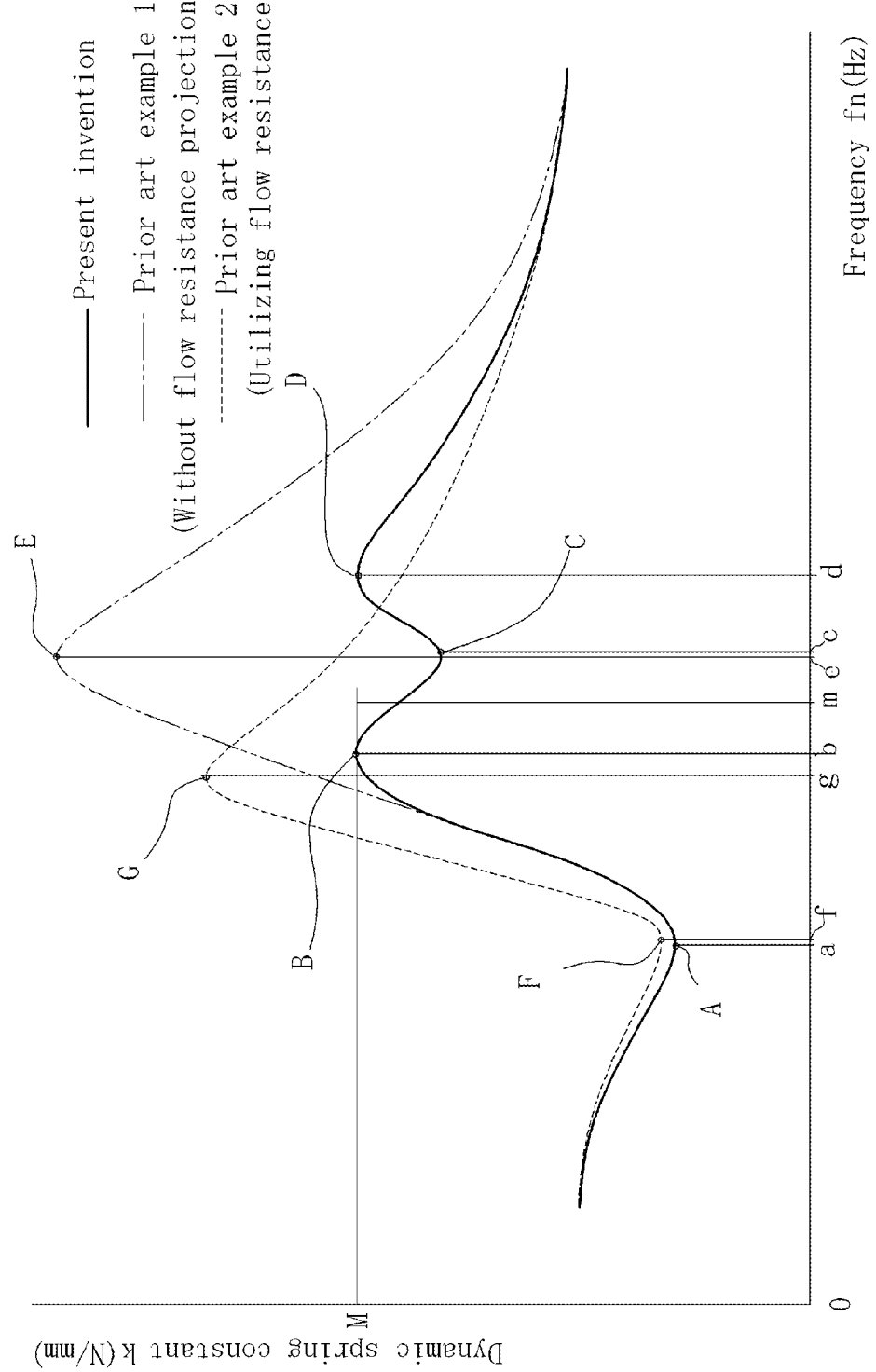
FIG. 7 is a graph of dynamic characteristics of the present invention and others.

FIG. 7 is the graph of dynamic spring curves, in which a vertical axis is the dynamic spring constant and a horizontal axis is the frequency. This graph indicates that first resonance by the annular liquid chamber resonance and second resonance by the elastic body resonance are created due to the horizontal vibration in the annular liquid chamber 6a. By the way, although liquid column resonance by the liquid resonance of the damping orifice 9 is produced due to the vibration (the vertical vibration) in the direction of the mount axis at the lower frequency than the range illustrated in the drawing, this is omitted from the drawing.

In the dynamic spring curve of the present invention as indicated by a solid line, a bottom (a minimum value, indicating the largest resonance) of the first resonance by the annular liquid chamber resonance occurs at A (frequency a), and a peak (a maximum value) of the antiresonance occurs at B (frequency b>a).

After this first resonance, the second resonance due to the elastic body resonance of the control projection 20 occurs. Then, a bottom occurs at C (frequency c>b), and a peak of the antiresonance occurs at D (frequency d>c).

On the other hand, a prior art example 1 which does not make use of the elastic body resonance and is not provided with the flow resistance projection as seen in the present invention, and in which only the annular liquid resonance is produced, has a characteristic as indicated by a phantom line. In this prior art example 1, a peak of the antiresonance accompanying the annular liquid chamber resonance is indicated at E (frequency e; b>e>d).

In comparison with this, in the present invention, the dynamic spring curve has two peaks B and D in a two-humped shape caused in front of and in the rear of the frequency c, due to the bottom C of the second resonance by the elastic body resonance of the control projection 20. The dynamic spring in the range of from b to d is decreased in a state of the peak E being lowered.

Further, a prior art example 2 which does not make use of the elastic body resonance as seen in the present invention and which makes use of the flow resistance by the flow resistance projection has a characteristic as indicated by a dashed line. In this prior art example 2, a bottom of the annular liquid chamber resonance occurs at F (frequency f), and a peak of the antiresonance occurs at G (frequency g). The frequencies f and g are located in the vicinity of the frequencies a and b, respectively.

Moreover, in the prior art example 1 having no flow resistance, strong annular liquid chamber resonance occurs at A (frequency a), and the peak of the antiresonance thereof occurs at the highest E (frequency e).

In comparison with this, since, with respect to the annular liquid chamber resonance of the prior art example 2, the resonance power is decreased by the flow resistance, the liquid resonance is weakened in relation to the prior art example 1 having no flow resistance, so that the bottom is shallow and the peak of the antiresonance is lowered.

It is apparent from this graph that, when an upper limit of the dynamic spring constant required in the vicinity of resonance frequency m on the vehicle body side necessary for avoiding the aggravation of the vibration of the vehicle body is M, the dynamic spring constant in the vicinity of the frequency m is higher than M, in the prior art examples 1 and 2, whereby it is impossible to realize the low dynamic spring at the required level.

On the other hand, in the present invention, the dynamic spring constant is not more than M, so that the low dynamic spring is realized. Therefore, the low dynamic spring is achieved in the vicinity of the resonance frequency m on the vehicle body side whereby it is possible to prevent the aggravation of the vibration of the vehicle body.

Further, in the present invention in relation to the prior art example 1, the peaks of the antiresonance of the annular liquid chamber resonance are lowered greatly to B and D from E, whereby the low dynamic spring is achieved in the range in the vicinity of the frequency m due to the bottom C by the elastic body resonance of the control projection 20 and due to the peaks B and D of the antiresonance in a two-humped shape in front of and in the rear of the bottom C.

Further, in the present invention, the control of the annular liquid chamber resonance is not reliant on the flow resistance, and the control projection 20 is able to be provided in the location where the stress concentration is small. Therefore, the durability is remarkably improved.

Accordingly, the present invention is not reliant on such flow resistance as seen in the prior art example 2, and the annular liquid chamber resonance is controlled by the elastic body resonance, whereby the outstanding durability can be obtained.

Figure 8:
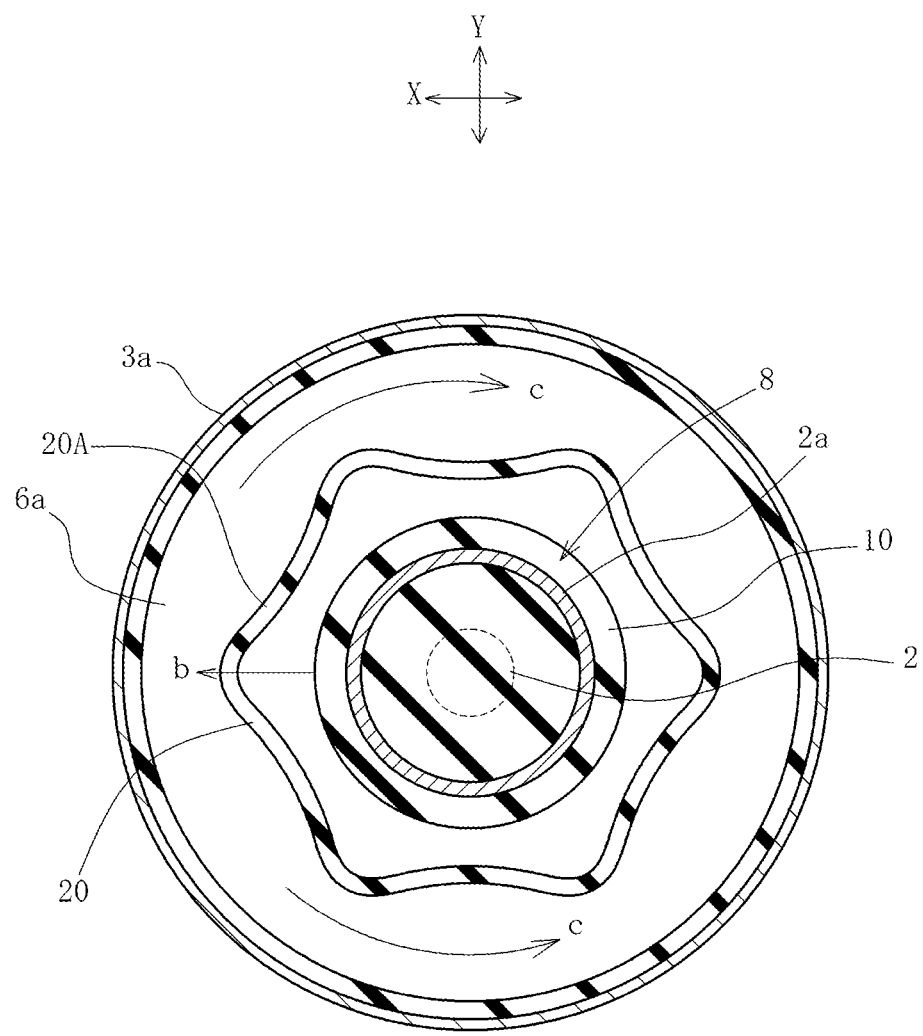
FIG. 8 is a cross sectional view showing a part of another embodiment corresponding to FIG. 3.
Figure 9:
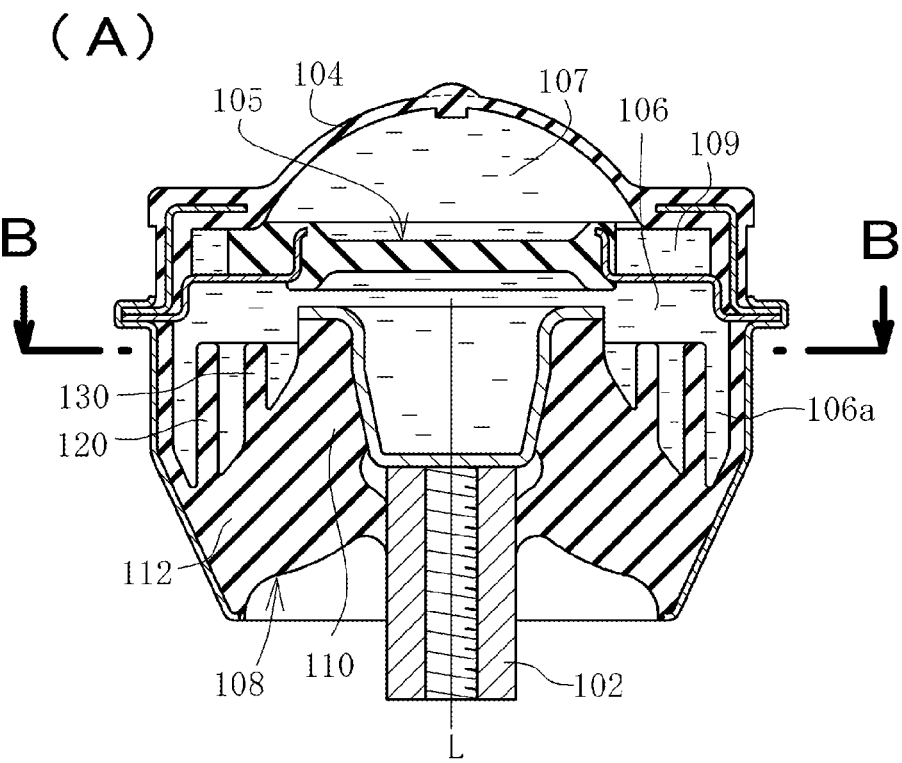
FIG. 9 is a cross sectional view of the prior art.
Figure 9:
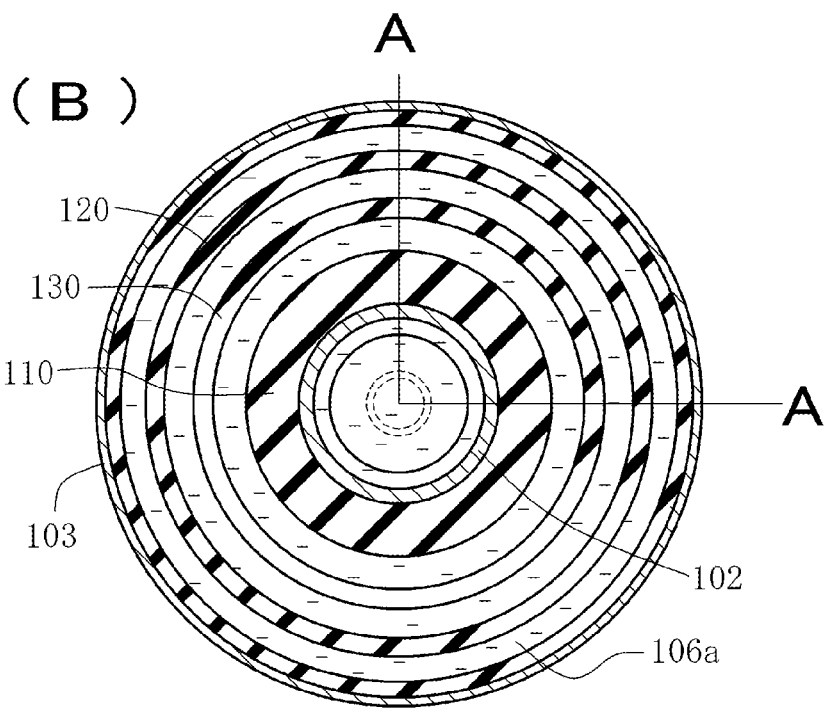

FIG. 8 shows another embodiment. This drawing corresponds to FIG. 3, in which, in a plan view, a control projection 20A is not formed in a simple ring shape and is characterized that it is of a corrugated shape. Other construction is the same as the previous embodiment.

Like this, when the control projection 20A is formed in the corrugated shape, the resonance frequency in the elastic body resonance is able to be adjusted by the partial change of rigidity in the circumferential direction.

Further, in this embodiment, although the control projection 20A is of a corrugated shape in a plan view, the upper end thereof may be formed in a corrugated shape in a side view. Namely, in a side view, the upper end of the control projection is undulated so as to be formed in the corrugated shape. In the case where the upper end is formed in the corrugated shape, the control projection is of corrugated shape similarly, so that the partial change of rigidity also is created in the circumferential direction to thereby make it possible to adjust the resonance frequency in the elastic body resonance.

The present invention is not limited to the above embodiments, and various modifications may be made. For example, the range of its use is not limited to the engine mount, and it may be applied to a suspension mount, etc.

What is claimed is:

1. An inverted type liquid sealed mount comprising:
    an inner metal fitting being mounted on one of a vibration source side and a vibration receiving side,
    an outer metal fitting being mounted on the other thereof,
    an insulator elastically connecting the inner metal fitting and the outer metal fitting,
    a liquid chamber being formed among the outer metal fitting, the insulator and a diaphragm covering an opening part of the insulator,
    a partition member for partitioning the liquid chamber into a lower primary liquid chamber and an upper secondary liquid chamber,
    a damping orifice being provided in the partition member to provide communication between the primary liquid chamber and the secondary liquid chamber and configured to produce a liquid resonance at a predetermined vibration,
    a main body section being formed by a part of the insulator and projecting upwardly in substantially a chevron shape in the direction of a mount axis,
    an annular liquid chamber being provided around the main body section and forming a part of the primary liquid chamber, and
    a control projection being integrally provided in an outside part of the main body section so as to project in the direction of the mount axis,
    the control projection has a ring shape in a plan view and is extending from an inclined surface portion of the main body section of substantially the chevron shape, said control projection being a single control projection,
    when a distance between a smallest diameter portion of the main body section and a liner layer provided on an inner surface of the outer metal fitting is W, the control projection is provided in a region of 3W/5 or less from the smallest diameter portion,
    an annular liquid chamber resonance of the annular liquid chamber is produced in a higher frequency range of the liquid resonance of the damping orifice,
    and an anti-resonance is produced in a higher frequency range of the annular liquid chamber resonance,
    wherein the control projection is allowed to produce an elastic body resonance in the frequency range of the anti-resonance due to the annular liquid chamber resonance of the annular liquid chamber.

2. The inverted type liquid sealed mount according to claim 1, wherein the control projection is formed in a corrugated shape in a plan view.

3. The inverted type liquid sealed mount according to claim 1, wherein the control projection is formed in a region overlapping, in a side view, with a cup portion which is inserted in the main body section for reinforcement.

4. The inverted type liquid sealed mount according to claim 2, wherein the control projection is formed in a region overlapping, in a side view, with a cup portion which is inserted in the main body section for reinforcement.

* * * * *